(12) United States Patent
Sonobe

(10) Patent No.: US 11,208,150 B2
(45) Date of Patent: Dec. 28, 2021

(54) AUTOMOTIVE FRAME MEMBER AND ELECTRIC VEHICLE

(71) Applicant: NIPPON STEEL CORPORATION, Tokyo (JP)

(72) Inventor: Soma Sonobe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 0 days.

(21) Appl. No.: 17/284,995

(22) PCT Filed: Oct. 23, 2019

(86) PCT No.: PCT/JP2019/041527
§ 371 (c)(1),
(2) Date: Apr. 13, 2021

(87) PCT Pub. No.: WO2020/085381
PCT Pub. Date: Apr. 30, 2020

(65) Prior Publication Data
US 2021/0245812 A1   Aug. 12, 2021

(30) Foreign Application Priority Data

Oct. 24, 2018   (JP) .............................. JP2018-199818

(51) Int. Cl.
*B62D 21/15*   (2006.01)
*B60R 16/04*   (2006.01)
*B62D 25/02*   (2006.01)

(52) U.S. Cl.
CPC ............ *B62D 21/157* (2013.01); *B60R 16/04* (2013.01); *B62D 25/025* (2013.01)

(58) Field of Classification Search
CPC ...... B62D 21/157; B62D 25/025; B60R 16/04
(Continued)

(56) References Cited

U.S. PATENT DOCUMENTS 10,293,862 B1 *   5/2019  Patel ...................... B62D 21/15
10,850,774 B2 *   12/2020  Amrit .................. B62D 21/155
(Continued)

FOREIGN PATENT DOCUMENTS

DE   10 2006 001 061 A1   9/2007
JP   2006-205797 A   8/2006
(Continued)

*Primary Examiner* — D Glenn Dayoan
*Assistant Examiner* — E Turner Hicks
(74) *Attorney, Agent, or Firm* — Birch, Stewart, Kolasch & Birch, LLP.

(57) ABSTRACT

An automotive frame member includes a hat member and a closing plate, in which the hat member includes a top plate, two vertical walls, and two flanges, the two vertical walls are positioned between the top plate and the flanges, respectively, the two vertical walls face each other, the two flanges are respectively joined to the closing plate, each of the two vertical walls includes plural groove parts extending in a direction vertical to a longitudinal direction of the hat member, the groove part includes a bottom surface and two side surfaces, the two side surfaces face each other, the two side surfaces are positioned on both sides of the bottom surface, and a width a of the groove part and a depth b of the groove part in a cross section parallel to the top plate, and a height c of the vertical wall in a direction vertical to the top plate satisfy relations of $0.2 \leq a/c \leq 0.3$ and $0.2 \leq b/c \leq 0.3$.

8 Claims, 14 Drawing Sheets

(58) Field of Classification Search
USPC .................. 296/209, 30, 203.03, 187.12
See application file for complete search history.

(56) References Cited

U.S. PATENT DOCUMENTS

| | | | |
|---|---|---|---|
| 2010/0066106 A1* | 3/2010 | Nojima | B60R 19/18 |
| | | | 293/120 |
| 2018/0237075 A1 | 8/2018 | Kawabe et al. | |
| 2018/0337377 A1* | 11/2018 | Stephens | B60L 50/64 |
| 2020/0031399 A1* | 1/2020 | Matsuda | B62D 21/03 |
| 2020/0094886 A1* | 3/2020 | Otsuka | B62D 21/15 |

FOREIGN PATENT DOCUMENTS

| | | |
|---|---|---|
| JP | 2006-207679 A | 8/2006 |
| JP | 2008-265738 A | 11/2008 |
| JP | 2018-131133 A | 8/2018 |

* cited by examiner

VEHICLE WIDTH DIRECTION

| WIDTH (a/c) | DEPTH (b/c) | 0.1 | 0.2 | 0.3 |
|---|---|---|---|---|
| 0.1 | | BENDING MODE (OUT-OF-PLANE) | BENDING MODE (IN-PLANE) | BENDING MODE (IN-PLANE) |
| 0.2 | | BENDING MODE (OUT-OF-PLANE) | AXIAL CRUSH MODE | AXIAL CRUSH MODE |
| 0.3 | | BENDING MODE (OUT-OF-PLANE) | AXIAL CRUSH MODE | AXIAL CRUSH MODE |

AUTOMOTIVE FRAME MEMBER AND ELECTRIC VEHICLE

TECHNICAL FIELD

The present disclosure relates to an automotive frame member which exhibits a high energy absorption efficiency, for example, in a collision of an automotive or the like.

BACKGROUND ART

In recent years, fuel consumption restriction becomes strict in the world, and not only improvement of collision performance but also a reduction in weight of a vehicle body of an automotive is demanded. However, even if a material of an automotive frame member is simply replaced with a material with high strength and small plate thickness, there is a possibility that buckling occurs in early stages at a time of collision in accordance with a reduction in rigidity depending on a shape of the frame member, and thus a high energy absorption efficiency is not always obtained. Although the energy absorption performance is increased as a proportion of parts to be subjected to plastic deformation of the frame member becomes large, when buckling occurs in early stages at the time of collision, there remain a lot of parts which are not subjected to plastic deformation, and thus even if material strength is increased, the degree of improvement of the energy absorption performance becomes small. Accordingly, a study regarding a frame member capable of taking advantage of the original strength of its material so as to prevent buckling from occurring in early stages at the time of collision, is being promoted. Further, in electric vehicles, a vehicle body structure in which a large capacity battery is mounted under a floor is being developed, and improvement of a frame member such as a side sill is being promoted.

As a technique intended to improve the energy absorption performance, Patent Document 1 discloses that a bulkhead having a substantially U-shaped cross section is provided between a side sill and a cross member. The bulkhead in Patent Document 1 is configured by a front surface part, a rear side surface part, and a flange, and a recessed portion is provided to the front surface part and the rear side surface part. Patent Document 2 discloses an impact absorbing member in which a deformation facilitating means in a bellows shape is provided to a hollow member. When a bending load due to impact is applied to the impact absorbing member in Patent Document 2, the deformation facilitating means in the bellows shape is buckled, resulting in that the bending load is transformed into a compressive load in a longitudinal direction, to thereby suppress sectional collapse. Patent Document 3 discloses an absorber made of metal in which recessed or protruding beads are formed on a vertical wall of a hat member.

PRIOR ART DOCUMENT

Patent Document

Patent Document 1: Japanese Laid-open Patent Publication No. 2006-205797

Patent Document 2: Japanese Laid-open Patent Publication No. 2006-207679

Patent Document 3: Japanese Laid-open Patent Publication No. 2008-265738

SUMMARY OF THE INVENTION

Problems to be Solved by the Invention

The vehicle body structure in Patent Document 1 is not a structure which is intended to suppress the buckling of the side sill itself, so that there is room for improvement in terms of the improvement of the energy absorption performance realized by taking advantage of the material strength. Further, when the present inventors performed a simulation regarding the impact absorbing member in Patent Document 2, there remained a lot of parts which were not subjected to plastic deformation in the impact absorbing member, and thus there is room for improvement in terms of the improvement of the energy absorption performance realized by taking advantage of the material strength. The absorber in Patent Document 3 is one intended to protect a leg part of a pedestrian when a collision between the pedestrian and an automotive occurs, and thus there is room for improvement in terms of the improvement of the energy absorption performance on the vehicle body side.

The present disclosure has been made in view of the above-described problems, and an object thereof is to improve an energy absorption efficiency (a mass efficiency of absorbed energy) of an automotive frame member.

Means for Solving the Problems

An aspect of the present disclosure for solving the above-described problems is an automotive frame member including a hat member and a closing plate, in which the hat member includes a top plate, two vertical walls, and two flanges, the two vertical walls are positioned between the top plate and the flanges, respectively, the two vertical walls face each other, the two flanges are respectively joined to the closing plate, each of the two vertical walls includes plural groove parts extending in a direction vertical to a longitudinal direction of the hat member, the groove part includes a bottom surface and two side surfaces, the two side surfaces face each other, the two side surfaces are positioned on both sides of the bottom surface, and a width a of the groove part and a depth b of the groove part in a cross section parallel to the top plate, and a height c of the vertical wall in a direction vertical to the top plate satisfy relations of $0.2 \leq a/c \leq 0.3$ and $0.2 \leq b/c \leq 0.3$.

An aspect of the present disclosure according to another viewpoint is an automotive frame member including a hollow member, in which the hollow member includes a top plate and two vertical walls, the two vertical walls are respectively adjacent to the top plate, the two vertical walls face each other, each of the two vertical walls includes plural groove parts extending in a direction vertical to a longitudinal direction of the hollow member, the groove part includes a bottom surface and two side surfaces, the two side surfaces face each other, the two side surfaces are positioned on both sides of the bottom surface, and a width a of the groove part and a depth b of the groove part in a cross section parallel to the top plate, and a height c of the vertical wall in a direction vertical to the top plate satisfy relations of $0.2 \leq a/c \leq 0.3$ and $0.2 \leq b/c \leq 0.3$.

Effect of the Invention

It is possible to improve an energy absorption efficiency of an automotive frame member.

EMBODIMENTS FOR CARRYING OUT INVENTION

Figure 1:
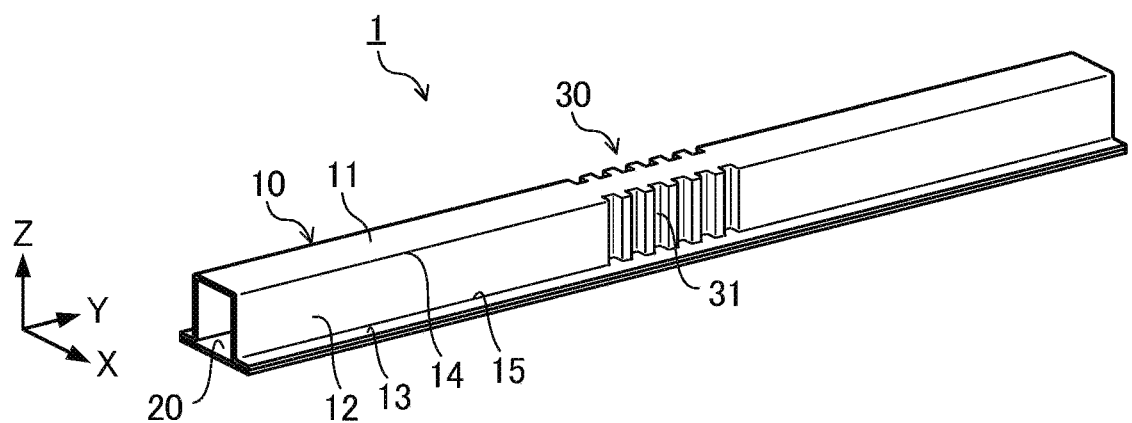
FIG. 1 is a perspective view illustrating a schematic configuration of an automotive frame member according to a first embodiment.

Hereinafter, embodiments according to the present disclosure will be explained while referring to the drawings. Note that the same codes are given to components having substantially the same functional configurations in the present description and the drawings to omit duplicated explanation.

First Embodiment

FIG. 1 is a view illustrating a schematic configuration of an automotive frame member 1 in a first embodiment. The automotive frame member 1 is a member that receives a bending load, such as a side sill or a bumper beam. The automotive frame member 1 of the first embodiment has a hat member 10 being a member whose cross section vertical to a member longitudinal direction (Y direction in FIG. 1) has a hat shape, and a flat closing plate 20 being a bottom plate that is joined to the hat member 10. Note that an X direction, the Y direction, and a Z direction illustrated in FIG. 1 are directions which are vertical to one another, and when the automotive frame member 1 is a member configuring a side sill, for example, the X direction is a vehicle height direction, the Y direction is a vehicle length direction, and the Z direction is a vehicle width direction. Further, when the automotive frame member 1 is a member configuring a bumper beam, for example, the X direction is the vehicle height direction, the Y direction is the vehicle width direction, and the Z direction is the vehicle length direction.

Figure 2:
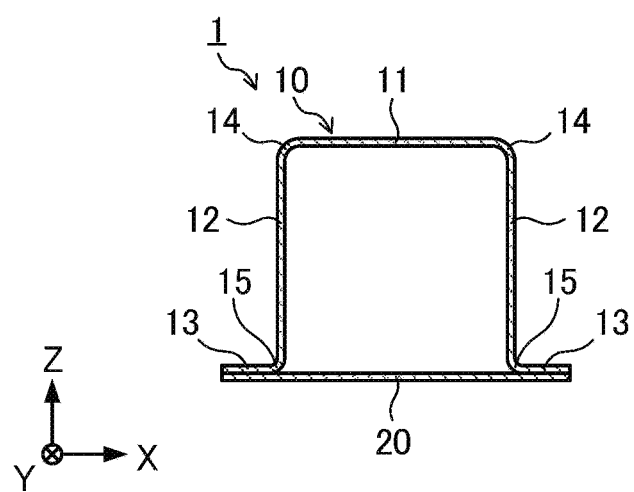
FIG. 2 is a view illustrating a cross section vertical to a member longitudinal direction at a part, where no groove part is provided, of the automotive frame member.

As illustrated in FIG. 2, the hat member 10 has a top plate 11, two vertical walls 12 connected to the top plate 11, and two flanges 13 connected to the vertical walls 12. The two vertical walls 12 are positioned between the top plate 11 and the flanges 13, respectively, and the two vertical walls 12 face each other. In the first embodiment, the two flanges 13 of the hat member 10 and the closing plate 20 are joined, to thereby configure the automotive frame member 1. Although the hat member 10 is formed of a steel product with tensile strength of 440 to 1500 MPa, for example, a material of the hat member 10 is not particularly limited, and the hat member 10 may be, for example, an aluminum alloy member, a magnesium alloy member, or the like. Similarly, although the closing plate 20 is formed of a steel product with tensile strength of 440 to 1500 MPa, for example, a material of the closing plate 20 is not particularly limited, and the closing plate 20 may be, for example, an aluminum alloy member, a magnesium alloy member, or the like.

Figure 3:
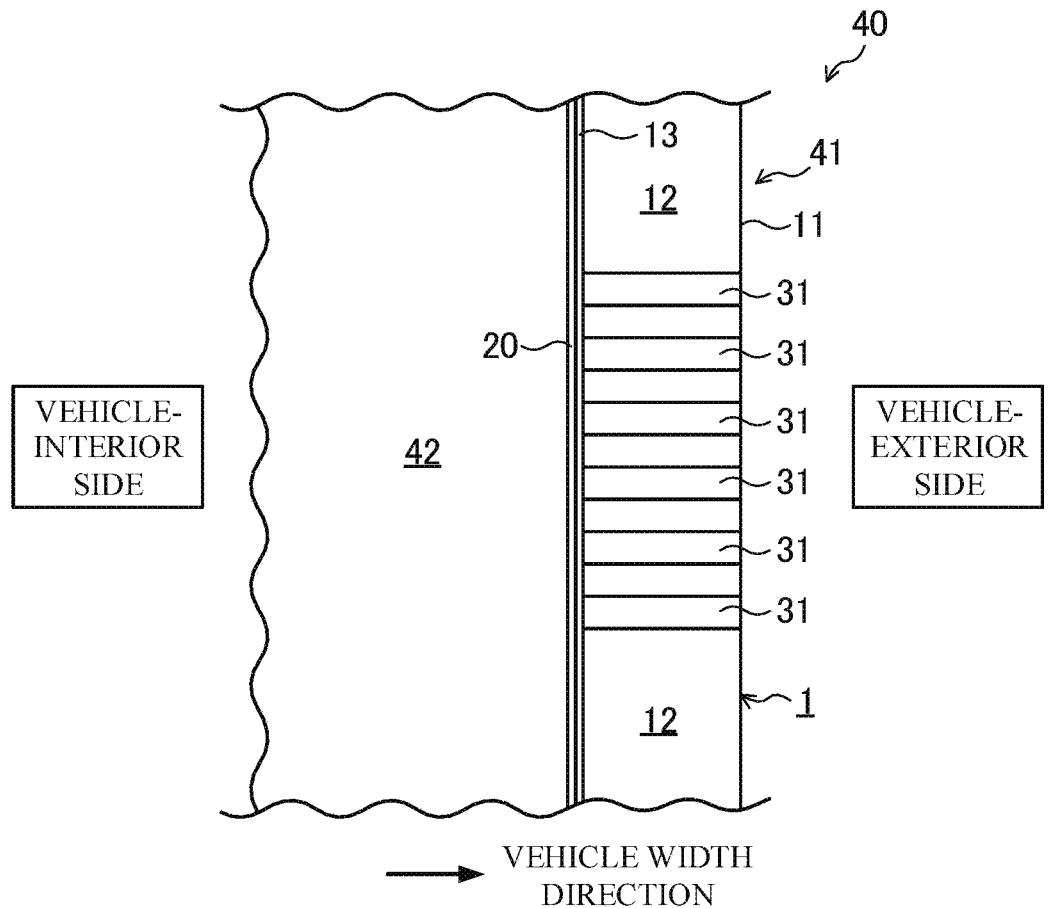
FIG. 3 is a view illustrating a periphery of a side sill in a cross section vertical to a vehicle height direction of an electric vehicle.

When the automotive frame member 1 is attached to a vehicle body, the top plate 11 of the hat member 10 may be disposed on a vehicle-exterior side or a vehicle-interior side with respect to the closing plate 20. When the automotive frame member 1 is used for a side sill, in particular, the top plate 11 is preferably disposed on the vehicle-exterior side with respect to the closing plate 20. This is because, if a flange of the hat member is positioned on the vehicle-exterior side, the flange and a door interfere with each other, which prevents the door from closing. Further, it is preferable to apply the present disclosure to an electric vehicle. This is because, by allowing impact to be absorbed by a side sill, it is possible to prevent damage to a battery which is disposed further on the vehicle-interior side than the side sill. FIG. 3 is a view illustrating a periphery of a side sill 41 in a cross section vertical to a vehicle height direction of an electric vehicle 40. As illustrated in FIG. 3, when the automotive frame member 1 is a member configuring the side sill 41, it is preferable that the closing plate 20 is adjacent to a battery 42 mounted on a floor panel (not illustrated), and the top plate 11 is disposed on the vehicle-exterior side, out of the vehicle-exterior side and the vehicle-interior side. Note that in the present embodiment and embodiments to be described later, the top plate 11 is disposed on the vehicle-exterior side, out of the vehicle-exterior side and the vehicle-interior side.

Figure 4:
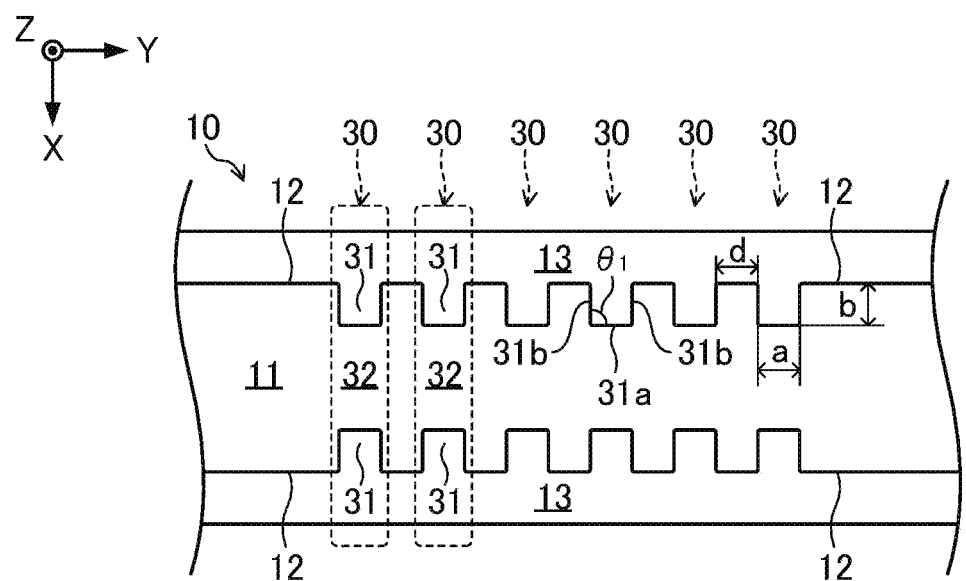
FIG. 4 is a plan view of a periphery of groove formation places of a hat member.
Figure 5:
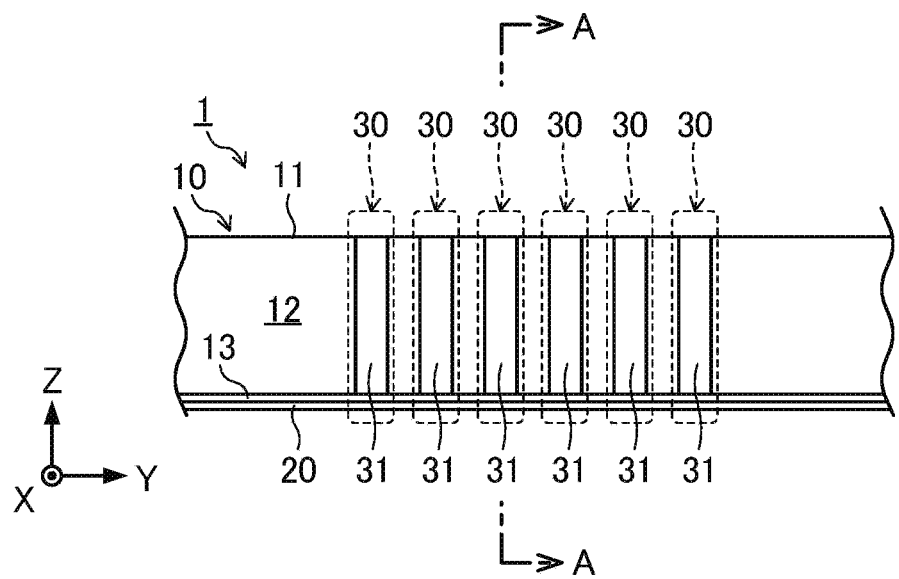
FIG. 5 is a side view of a periphery of the groove formation places of the hat member.
Figure 6:
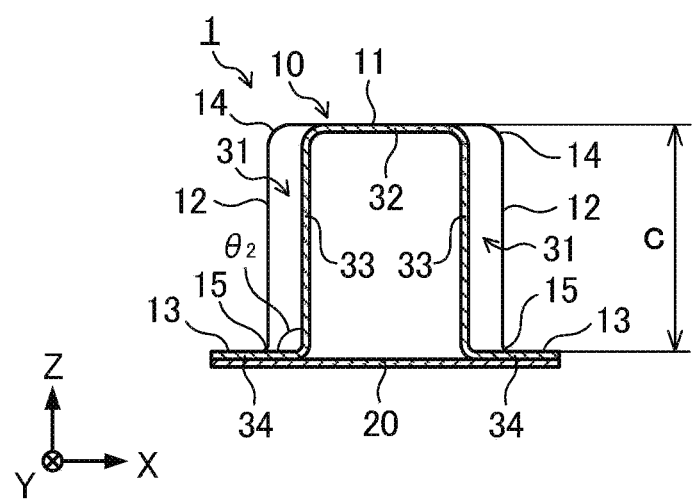
FIG. 6 is a sectional view taken along A-A in FIG. 5.

As illustrated in FIG. 1 and FIG. 4 to FIG. 6, the hat member 10 of the first embodiment has a groove part 31 extending in a direction vertical to a member longitudinal direction. From a viewpoint of effectively improving an energy absorption efficiency, the groove part 31 is preferably formed so as to be provided continuously from a ridge line portion 14 to a ridge line portion 15, namely, it is preferably formed from a vehicle-interior-side end portion to a vehicle-exterior-side end portion of the vertical wall 12, as illustrated in FIG. 1 and FIG. 4 to FIG. 6. The groove part 31 is provided to both of a pair of vertical walls 12. A molding method of the groove part 31 is not particularly limited, and the molding is performed in a manner that, for example, after molding the hat member 10, presswork is repeatedly performed to gradually increase a depth of the groove part 31. In the present description, a place where the groove part 31 is formed as illustrated in FIG. 4 is referred to as a "groove formation place 30". Further, as illustrated in FIG. 6, in the present description, the top plate 11 at the groove formation place 30 is referred to as a "groove part top plate 32", the vertical wall 12 at the groove formation place 30 is referred to as a "groove part vertical wall 33", and the flange 13 at the groove formation place 30 is referred to as a "groove part flange 34".

The groove part top plate 32 is positioned within a plane same as that of the top plate 11 of a part except for the groove formation place 30, and the groove part flange 34 is positioned within a plane same as that of the flange 13 of a part except for the groove formation place 30. As illustrated in FIG. 4, the groove part vertical wall 33 of the first embodiment has a bottom surface 31a of the groove part 31 being a surface parallel to the vertical wall 12 of a part except for the groove formation place 30, and side surfaces 31b being a pair of flat surfaces connecting the vertical wall 12 of a part except for the groove formation place 30 and the bottom surface 31a of the groove part 31. Specifically, the groove part 31 includes the bottom surface 31a and the two side surfaces 31b, and the two side surfaces 31b face each other and are positioned on both sides of the bottom surface 31a.

A plurality of the groove formation places 30 is provided with an interval provided therebetween along the member longitudinal direction of the hat member 10. Specifically, the two vertical walls 12 include a plurality of the groove parts 31 along the member longitudinal direction of the hat member 10. In the first embodiment, a region in which the groove formation places 30 exist is only a middle part of the hat member 10 in the member longitudinal direction, but the groove formation places 30 may also be provided along the entire region of the hat member 10 in the member longitudinal direction, for example. Since the plural groove formation places 30 are provided, the vertical wall 12 positioned between the adjacent groove formation places 30 is shaped so as to protrude from the bottom surface 31a of the groove part 31.

The automotive frame member 1 of the first embodiment is configured as described above. In this automotive frame member 1, when a collision occurs, a load is partially applied from the Z direction and moment is produced, resulting in that bending deformation occurs. In the automotive frame member 1 of the first embodiment, the groove part 31 of the hat member 10 is provided to not only the vertical wall 12 but also the ridge line portion 14 between the vertical wall 12 and the top plate 11 and the ridge line portion 15 between the vertical wall 12 and the flange 13, so that when compared to a case where no groove part 31 is provided to each of the ridge line portions 14, 15, surface rigidity of the top plate 11 is increased, and it is possible to increase a load required for the deformation of the automotive frame member 1. Further, the groove part 31 is shaped to have three flat surfaces, namely, the bottom surface 31a and the two side surfaces 31b of the groove part 31, so that it is possible to further increase the surface rigidity of the top plate 11, and it is possible to further increase the load required for the deformation of the automotive frame member 1. Because of these actions, it is possible to improve the energy absorption performance in the automotive frame member 1 of the first embodiment. Further, the automotive frame member 1 of the first embodiment does not have a structure in which a reinforcing member is newly added, and thus it is possible to improve a mass efficiency regarding the energy absorption performance.

Note that when the automotive frame member 1 is deformed, any of the following deformation modes occurs.
(Out-of-Plane Bending Mode)

Figure 7:
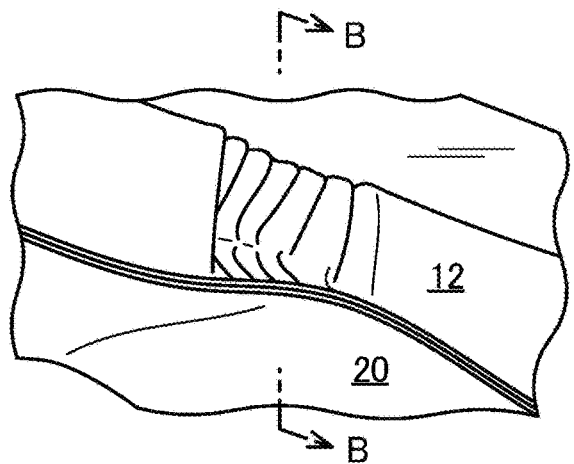
FIG. 7 is a view illustrating one example of a deformation mode (out-of-plane bending mode) of an automotive frame member.
Figure 8:
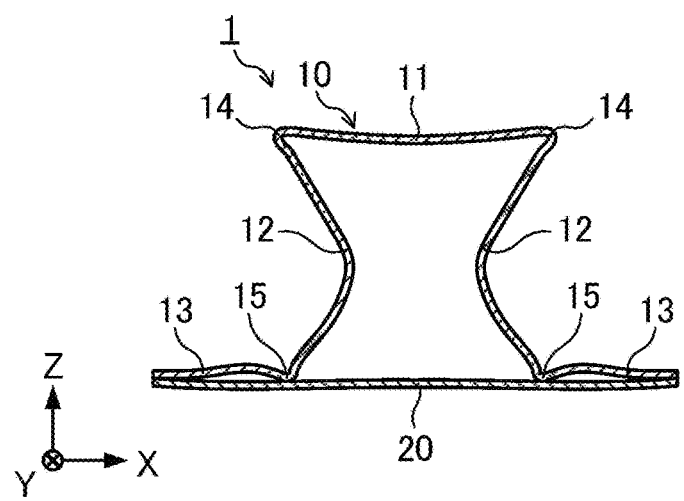
FIG. 8 is a sectional view taken along B-B in FIG. 7.

As illustrated in FIG. 7 and FIG. 8, an out-of-plane bending mode is a mode in which main deformation is deformation in which the vertical wall 12 of the hat member 10 is bent in an out-of-plane direction in a cross section vertical to the member longitudinal direction.
(In-Plane Bending Mode)

Figure 9:
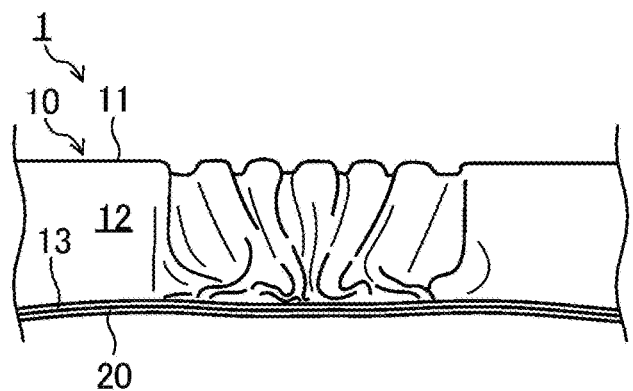
FIG. 9 is a view illustrating one example of a deformation mode (in-plane bending mode) of an automotive frame member.

As illustrated in FIG. 9, an in-plane bending mode is a mode in which main deformation is deformation in which the vertical wall 12 of the hat member 10 is bent along the member longitudinal direction, and thus deformation of the vertical wall 12 in the out-of-plane direction in the cross section vertical to the member longitudinal direction is small.
(Axial Crush Mode)

Figure 10:
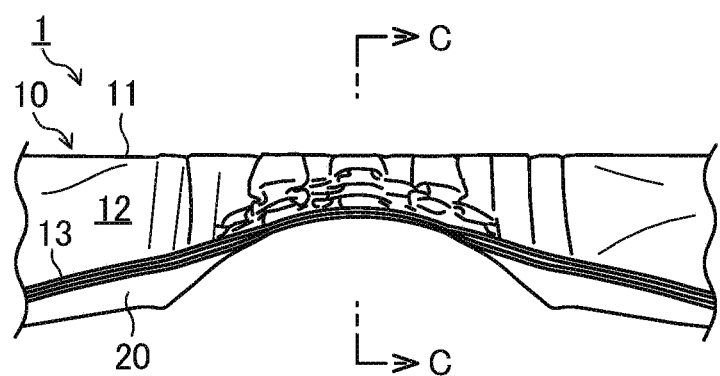
FIG. 10 is a view illustrating one example of a deformation mode (axial crush mode) of an automotive frame member.
Figure 11:
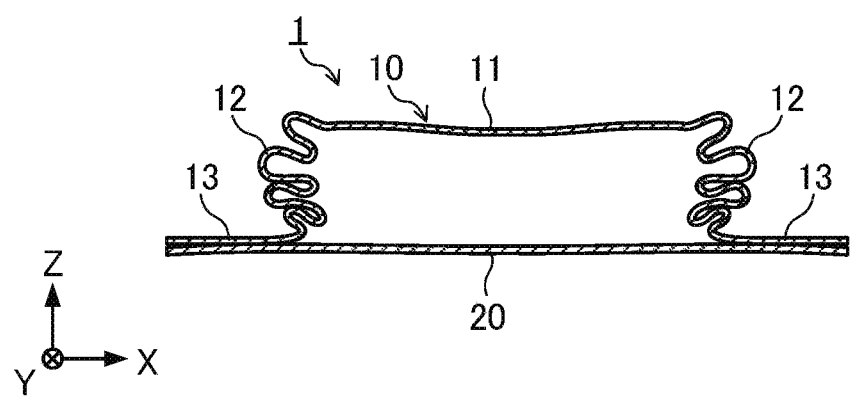
FIG. 11 is a sectional view taken along C-C in FIG. 10.

As illustrated in FIG. 10 and FIG. 11, an axial crush mode is a mode in which the vertical wall 12 of the hat member 10 crushes at short intervals in the cross section vertical to the member longitudinal direction, and deformation in a bellows shape occurs as a whole.

In order to increase the load required for the deformation, from the initial stage of collision to the latter stage of collision in a stable manner, the automotive frame member 1 is preferably deformed at the axial crush mode.

Here, a width of the groove part 31 and a depth of the groove part 31 in a cross section parallel to the top plate 11 of the hat member 10 are defined as "a" and "b", respectively, as illustrated in FIG. 4, and a height of the vertical wall 12 in a direction vertical to the top plate 11 of the hat member 10 is defined as "c", as illustrated in FIG. 6. Note that the width a of the groove part 31 is a distance between the side surfaces 31b which face each other, in the member longitudinal direction of the hat member 10 (Y direction). The depth b of the groove part 31 is a length from the vertical wall 12 to the bottom surface 31a of the groove part 31 in a direction vertical to the member longitudinal direction of the hat member 10 (X direction), in the cross section parallel to the top plate 11 of the hat member 10. The height c of the vertical wall 12 is a length from the flange 13 to the top plate 11 in a direction vertical to the member longitudinal direction of the hat member 10 (Z direction). Note that in the first embodiment, the height c of the vertical wall 12 is equal to a height from the groove part flange 34 to the groove part top plate 32.

In order to make it easy to cause the deformation in the axial crush mode in the automotive frame member 1, the width a of the groove part 31, the depth b of the groove part 31, and the height c of the vertical wall 12 of the hat member 10 preferably satisfy relations of $0.2 \leq a/c \leq 0.3$ and $0.2 \leq b/c \leq 0.3$. When this numeric value range is satisfied, the deformation of the automotive frame member 1 is likely to become one of the axial crush mode, as in examples to be described later, and a load required for the deformation becomes large in a stable manner from the initial stage of collision to the latter stage of collision. This enables to further improve the energy absorption performance.

Further, an interval d between the adjacent groove parts 31 is preferably 50 mm or less. When the interval d between the groove parts 31 is 50 mm or less, the deformation in the axial crush mode is likely to occur, which enables to improve the energy absorption efficiency. The smaller the interval d between the groove parts 31 is, the more the energy absorption efficiency can be improved, but from a viewpoint of moldability of the hat member 10 having the groove parts 31, the interval d between the groove parts 31 is preferably 10 mm or more. Further, in order to more easily induce the deformation in the axial crush mode, an angle $\theta_1$ made by the bottom surface 31a of the groove part 31 and the side surface 31b of the groove part 31 is preferably 90 to 95 degrees, and it is more preferably a vertical angle. Further, in order to more easily induce the deformation in the axial crush mode, an angle $\theta_2$ made by the groove part vertical wall 33 and the groove part flange 34 is preferably 90 to 100 degrees as illustrated in FIG. 6, and it is more preferably a vertical angle.

Second Embodiment

Figure 12:
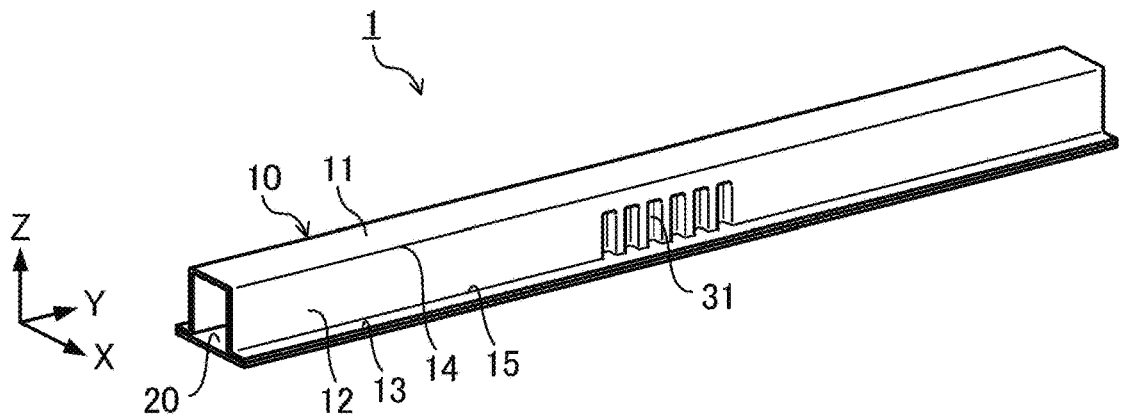
FIG. 12 is a perspective view illustrating a schematic configuration of an automotive frame member according to a second embodiment.
Figure 13:
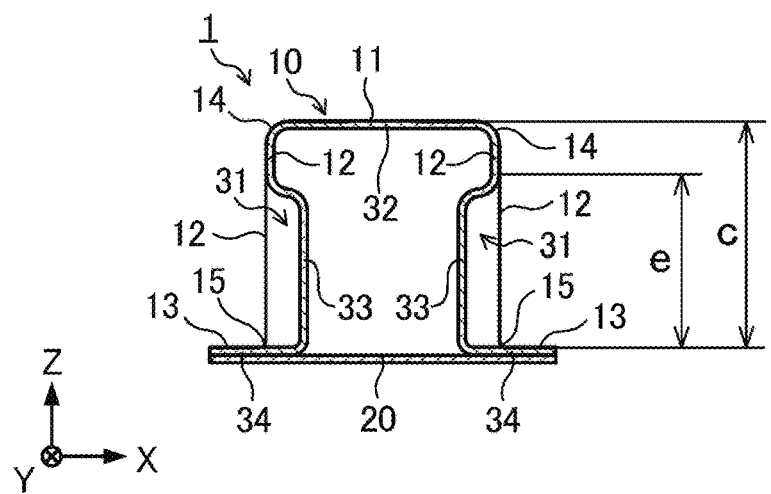
FIG. 13 is a view of the automotive frame member according to the second embodiment, the view corresponding to the cross section taken along A-A in FIG. 5.

As illustrated in FIG. 12 and FIG. 13, in an automotive frame member 1 of a second embodiment, the groove part 31 does not extend to the ridge line portion 14 of the hat member 10. Specifically, in the automotive frame member 1 of the second embodiment, one end of the groove part 31 extends to a vehicle-interior-side end portion of the vertical wall 12 (the ridge line portion 15 in an example of FIG. 14), but the other end of the groove part 31 does not extend to a vehicle-exterior-side end portion of the vertical wall 12 (the ridge line portion 14 in the example of FIG. 14). Even with the groove part 31 having such a shape, when the width a of the groove part 31, the depth b of the groove part 31, and the height c of the vertical wall 12 of the hat member 10 satisfy the relations of $0.2 \leq a/c \leq 0.3$ and $0.2 \leq b/c \leq 0.3$, it becomes easy to cause the deformation in the axial crush mode, resulting in that the energy absorption efficiency can be improved.

Figure 14:
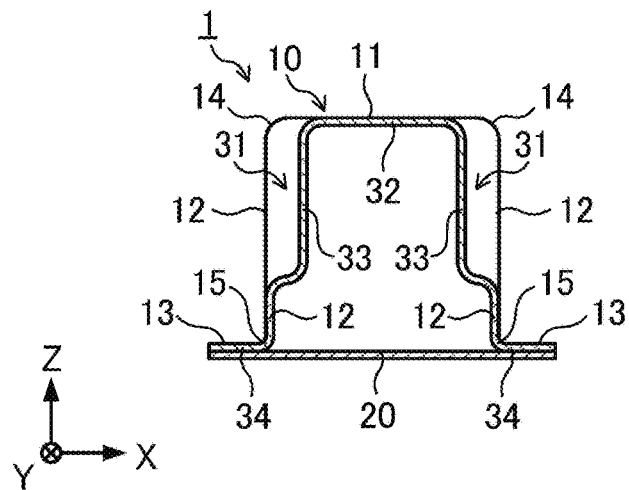
FIG. 14 is a view illustrating an example of shape of a groove part, the view corresponding to the cross section taken along A-A in FIG. 5.

FIG. 14 is a view illustrating an example of shape of the groove part 31. An automotive frame member 1 in the example of FIG. 14 has a structure in which although one end of the groove part 31 extends to the vehicle-exterior-side end portion of the vertical wall 12 (the ridge line portion 14 in the example of FIG. 14), the other end of the groove part 31 does not extend to the vehicle-interior-side end portion of the vertical wall 12 (the ridge line portion 15 in the example of FIG. 14), the structure being different from that of the example in FIG. 13. The automotive frame member 1 having the structure as illustrated in FIG. 13 described above can improve the energy absorption efficiency more than the automotive frame member 1 having the structure as illustrated in FIG. 14. When an impact load is input into the automotive frame member 1, a buckling region extends from a portion where buckling occurs first, of the vertical wall 12, which is set as a starting point, toward the vehicle-interior-side end portion of the vertical wall 12. For this reason, it is advantageous to set the portion to be buckled first to the vehicle-exterior side of the vertical wall 12, in terms of improvement of the energy absorption efficiency. There are two reasons for that. The first reason is that the closer the portion to be buckled first to the vehicle-exterior-side end portion of the vertical wall 12, the larger the region to be deformed in a bellows shape. The second reason is that when the vertical wall 12 on the vehicle-interior side is buckled precedently, a deviation between the extending direction of the groove part 31 on the vehicle-exterior side and the impact-input direction becomes large, resulting in that the deformation in the axial crush mode becomes difficult to occur. Specifically, the groove part 31 desirably extends to the vehicle-interior-side end portion of the vertical wall 12. The portion to be buckled first is a portion where no groove part 31 is provided. The reason why the buckling occurs first at the portion where no groove part 31 is provided, is because when there is no groove part 31, a deformation resistance is small. In the case of the automotive frame member 1 in FIG. 13, the groove part 31 extends to the vehicle-interior-side end portion of the vertical wall 12 (the ridge line portion 15 in the example of FIG. 13), and no groove part 31 is formed on the vehicle-exterior-side end portion of the vertical wall 12 (the ridge line portion 14 in the example of FIG. 13). Accordingly, when an impact load is input into the automotive frame member 1 in FIG. 13, buckling is likely to occur in the vicinity of the vehicle-exterior-side end portion of the vertical wall 12 (the ridge line portion 14 in the example of FIG. 13). On the other hand, in the automotive frame member 1 in FIG. 14, buckling is likely to occur in the vicinity of the vehicle-interior-side end portion of the vertical wall 12 (the ridge line portion 15 in the example of FIG. 14). Therefore, the automotive frame member 1 having the structure as illustrated in FIG. 13 can secure a large region to be deformed in a bellows shape when compared to the automotive frame member 1 having the structure as illustrated in FIG. 14, resulting in that the energy absorption efficiency can be improved.

Further, according to the automotive frame member 1 in the second embodiment, since the groove part 31 is not formed on the ridge line portion 14 being one of the ridge line portion 14 and the ridge line portion 15, it is easy to mold the hat member 10 when compared to the automotive frame member 1 of the first embodiment. Specifically, the automotive frame member 1 of the second embodiment is a member capable of realizing both the energy absorption efficiency and the moldability at a high level.

When the groove part 31 extends to the vehicle-interior-side end portion of the hat member 10 (the ridge line portion 15 in the example of FIG. 13) as in the second embodiment, a length e of the groove part 31 in a direction vertical to the top plate 11 of the hat member 10 is preferably a length of 80% or more of the height c of the vertical wall 12 of the hat member 10. This makes it easy to cause the deformation in the axial crush mode when an impact load is input, resulting in that the energy absorption efficiency can be improved. Note that the length e of the groove part 31 is a length, at the groove formation place 30, from the flange 13 to an R stop of the vertical wall 12 on the groove part 31 side. From a viewpoint of further improving the energy absorption efficiency, the length e of the groove part 31 is more preferably a length of 90% or more, and still more preferably a length of 95% or more of the height c of the vertical wall 12.

Third Embodiment

Figure 15:
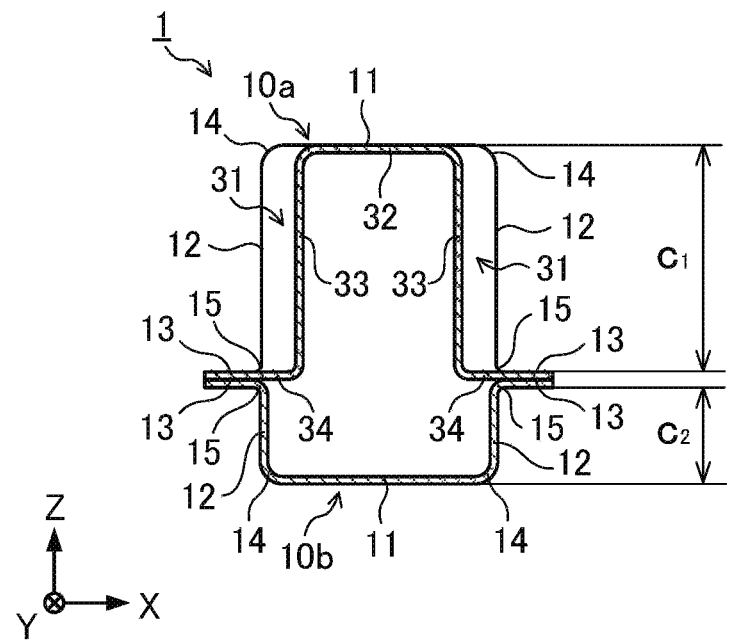
FIG. 15 is a view of an automotive frame member according to a third embodiment, the view corresponding to the cross section taken along A-A in FIG. 5.

In the automotive frame member 1 in the first embodiment, a mating member of the hat member 10 is the closing plate 20. In an automotive frame member 1 in the second embodiment illustrated in FIG. 15, a mating member is also a hat member. In the explanation below, the hat member described in the first embodiment (the upper member in FIG. 15) is referred to as a "first hat member 10$a$", and a hat member to be a mating member of the first hat member 10$a$ (the lower member in FIG. 15) is referred to as a "second hat member 10$b$". The second hat member 10$b$ also has the top plate 11, the pair of vertical walls 12 connected to the top plate 11, and the flanges 13 connected to the vertical walls 12, similarly to the first hat member 10$a$. The first hat member 10$a$ and the second hat member 10$b$ are joined by their flanges 13, to thereby configure the automotive frame member 1. Also in the automotive frame member 1 in the second embodiment, the groove part 31 of the first hat member 10$a$ has the bottom surface 31$a$ and the pair of side surfaces 31$b$ when seen from a direction vertical to the top plate 11, as illustrated in FIG. 4, and the groove part 31 is provided from the ridge line portion 14 to the ridge line portion 15, as illustrated in FIG. 15. For this reason, it is possible to improve the energy absorption efficiency.

Figure 16:
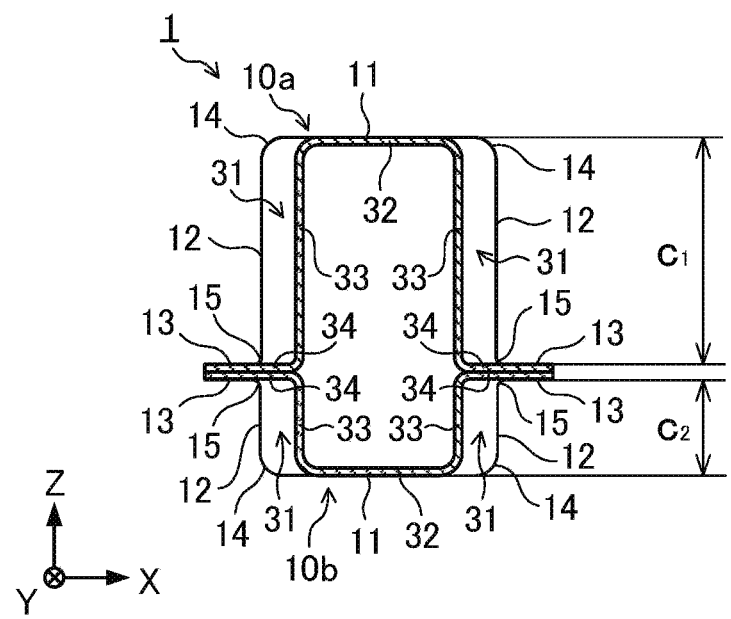
FIG. 16 is a view of an automotive frame member in which a groove part is provided to both a first hat member and a second hat member, the view corresponding to the cross section taken along A-A in FIG. 5.

Further, as illustrated in FIG. 16, the second hat member 10$b$ may also be provided with the groove part 31, similarly to the first hat member 10$a$. This makes it possible to further improve the energy absorption efficiency. Note that when the groove part 31 is provided to the second hat member 10$b$, a ratio between the width a of the groove part 31, and a sum c of a height $c_1$ of the first hat member 10$a$ and a height $c_2$ of the second hat member 10$b$ (a/c) is preferably 0.2 to 0.3, and a ratio between the depth b of the groove part 31, and the sum c of the height $c_1$ of the first hat member 10$a$ and the height $c_2$ of the second hat member 10$b$ (b/c) is preferably 0.2 to 0.3. Further, the angle $\theta_1$ made by the bottom surface 31$a$ of the groove part 31 and the side surface 31$b$ of the groove part 31 is preferably 90 to 95 degrees, and it is more preferably a vertical angle. Further, the angle $\theta_2$ made by the groove part vertical wall 33 and the groove part flange 34 is preferably 90 to 100 degrees, and it is more preferably a vertical angle.

Besides, when each of the first hat member and the second hat member 10$b$ has the groove formation place 30, a ratio between the height $c_2$ of the second hat member 10$b$ and the height $c_1$ of the first hat member 10$a$ ($c_2/c_1$) is preferably 0.25 or less. When this numeric value range is satisfied, the deformation in the axial crush mode is more likely to be induced, and it is possible to improve the energy absorption efficiency when compared to a case where the $c_2/c_1$ exceeds 0.25. The $c_2/c_1$ is more preferably 0.2 or less, and still more preferably 0.1 or less. Specifically, the smaller the $c_2/c_1$, the more preferable.

Fourth Embodiment

Figure 17:
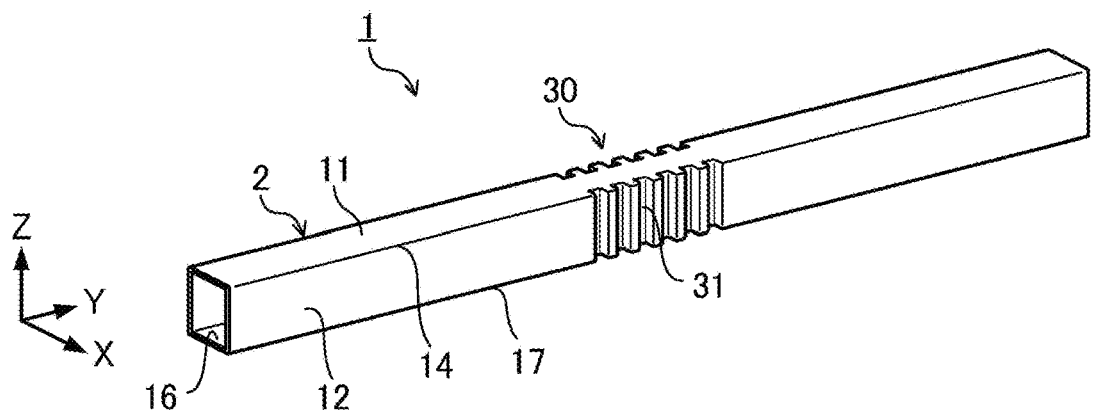
FIG. 17 is a perspective view illustrating a schematic configuration of an automotive frame member according to a fourth embodiment.
Figure 18:
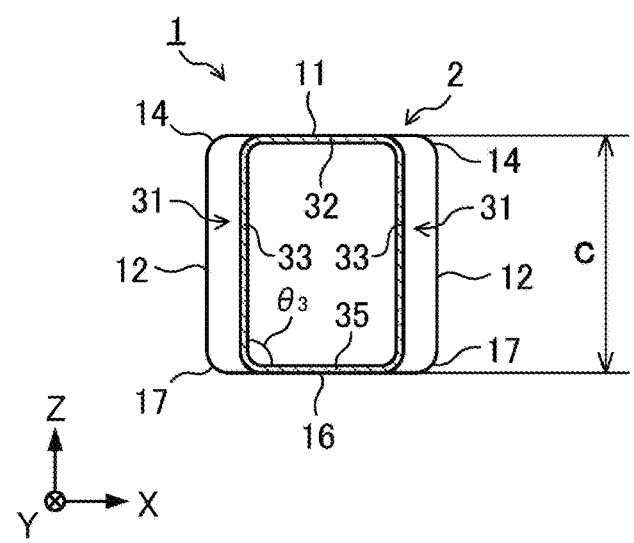
FIG. 18 is a view of the automotive frame member according to the fourth embodiment, the view corresponding to the cross section taken along A-A in FIG. 5.

Although the automotive frame member 1 of each of the first to third embodiments described above is configured by the plural members which are mutually joined, an automotive frame member 1 of a fourth embodiment is configured by a square tubular hollow member 2, as illustrated in FIG. 17 and FIG. 18. The hollow member 2 has a top plate 11, two vertical walls 12 connected to the top plate 11, and a bottom plate 16 connected to the two vertical walls 12. The two vertical walls 12 are positioned between the top plate 11 and the bottom plate 16, respectively, and the two vertical walls 12 face each other. Further, the top plate 11 and the bottom plate 16 also face each other. A material of the hollow member 2 is not particularly limited, and it is, for example, a steel product of an aluminum alloy member, a magnesium alloy member, or the like. When the automotive frame member 1 of the fourth embodiment is a member configuring the side sill 41 of the electric vehicle 40, for example, the top plate 16 of the hollow member 2 is adjacent to the battery 42 mounted on the floor panel (not illustrated), similarly to the example of FIG. 3.

The automotive frame member 1 of the fourth embodiment has plural groove parts 31 extending in a direction vertical to a member longitudinal direction of the hollow member 2, similarly to the first to third embodiments. From a viewpoint of effectively improving the energy absorption efficiency, the groove part 31 is preferably formed so as to be provided continuously from a ridge line portion 14 to a ridge line portion 17, namely, it is preferably formed from a vehicle-interior-side end portion to a vehicle-exterior-side end portion of the vertical wall 12. The groove part 31 is provided to both of a pair of vertical walls 12. A molding method of the groove part 31 is not particularly limited, and the molding is performed in a manner that, after forming a square tubular hollow member through extrusion molding, for example, presswork is repeatedly performed to gradually increase a depth of the groove part 31. Further, the groove part 31 may also be formed by hydroforming, for example.

Plural groove formation places 30 are provided along the member longitudinal direction of the hollow member 2. Specifically, the two vertical walls 12 include the plural groove parts 31 along the member longitudinal direction of the hollow member 2. In the present description, the top plate 11 at the groove formation place 30 is referred to as a "groove part top plate 32", the vertical wall 12 at the groove formation place 30 is referred to as a "groove part vertical wall 33", and the bottom plate 16 at the groove formation place 30 is referred to as a "groove part bottom plate 35". The groove part top plate 32 is positioned within a plane same as that of the top plate 11 of a part except for the groove formation place 30, and the groove part bottom plate 35 is positioned within a plane same as that of the bottom plate 16 of a part except for the groove formation place 30. A shape of the groove part 31 in a plan view is similar to that of the first to third embodiments. Specifically, similarly to the case of FIG. 4, also in the automotive frame member 1 of the fourth embodiment, the groove part vertical wall 33 has a bottom surface 31$a$ of the groove part 31 being a surface parallel to the vertical wall 12 of a part except for the groove formation place 30, and side surfaces 31$b$ being a pair of flat surfaces connecting the vertical wall 12 of a part except for the groove formation place 30 and the bottom surface 31$a$ of the groove part 31. Specifically, the groove part 31 includes the bottom surface 31$a$ and the two side surfaces 31$b$, and the two side surfaces 31$b$ face each other and are positioned on both sides of the bottom surface 31$a$.

The automotive frame member 1 of the fourth embodiment is configured as described above. Also in the automotive frame member 1 of the fourth embodiment, the width a of the groove part 31 (FIG. 4), the depth b of the groove part 31 (FIG. 4), and a height c of the vertical wall 12 of the hollow member 2 (FIG. 18) satisfy relations of $0.2 \leq a/c \leq 0.3$ and $0.2 \leq b/c \leq 0.3$. For this reason, it is possible to improve the energy absorption efficiency, similarly to the automotive frame member 1 of the first to third embodiments. Note that the height c of the vertical wall 12 of the hollow member 2 is a length from the bottom plate 16 to the top plate 11 in a direction vertical to the member longitudinal direction (Z direction). Further, the height c of the vertical wall 12 of the hollow member 2 of the fourth embodiment is equal to a height from the groove part bottom plate 35 to the groove part top plate 32.

The interval d between the adjacent groove parts 31 (FIG. 4) is preferably 50 mm or less, similarly to the first to third embodiments. Consequently, the deformation in the axial crush mode is likely to occur, which enables to improve the energy absorption efficiency. From a viewpoint of moldability of the hollow member 2 having the groove parts 31, the interval d between the groove parts 31 is preferably 10 mm or more. Further, in order to more easily induce the deformation in the axial crush mode, the angle $\theta_1$ made by the bottom surface 31a of the groove part 31 and the side surface 31b of the groove part 31 (FIG. 4) is preferably 90 to 95 degrees, and it is more preferably a vertical angle. Further, in order to more easily induce the deformation in the axial crush mode, an angle $\theta_3$ made by the groove part vertical wall 33 and the groove part bottom plate 35 is preferably 80 to 90 degrees as illustrated in FIG. 18, and it is more preferably a vertical angle.

Figure 19:
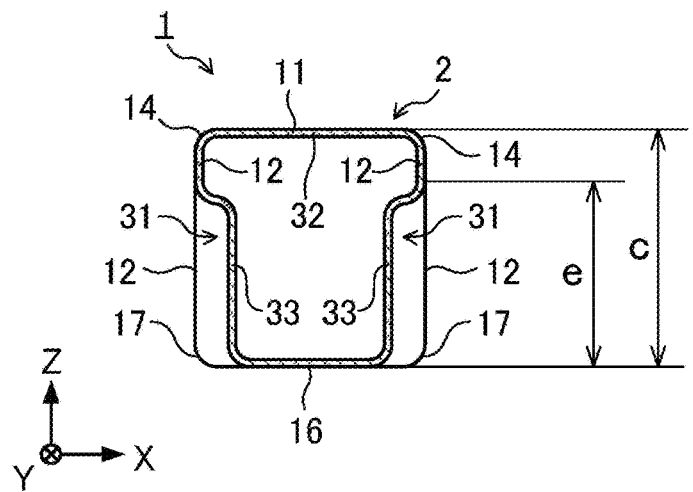
FIG. 19 is a view illustrating an example of shape of a groove part.

Similarly to the second embodiment illustrated in FIG. 12, also in the case where the automotive frame member 1 is configured by the hollow member 2, the groove part 31 may not be formed along the entire region from the vehicle-interior-side end portion (the ridge line portion 17 in the example of FIG. 19) to the vehicle-exterior-side end portion (the ridge line portion 14 in the example of FIG. 19) of the vertical wall 12, as illustrated in FIG. 19. When the groove part 31 is not formed up to the vehicle-exterior-side end portion as illustrated in FIG. 19, the length e of the groove part 31 in a direction vertical to the top plate 11 of the hollow member 2 is preferably a length of 80% or more of the height c of the vertical wall 12 of the hollow member 2. Consequently, it is possible to realize both the energy absorption efficiency and the moldability at a high level, similarly to the automotive frame member 1 of the second embodiment as illustrated in FIG. 13. From a viewpoint of further improving the energy absorption efficiency, the length e of the groove part 31 is more preferably a length of 90% or more, and still more preferably a length of 95% or more of the height c of the vertical wall 12. Note that the length e of the groove part 31 when the automotive frame member 1 is configured by the hollow member 2 is a length, at the groove formation place 30, from the bottom plate 16 of the hollow member 2 to an R stop of the vertical wall 12 on the groove part 31 side.

Embodiments according to the present disclosure have been explained above, but the present disclosure is not limited to the embodiments. It should be understood that various changes or modifications are readily apparent to those skilled in the art within the scope of the technical spirit as set forth in claims, and those should also be covered by the technical scope of the present disclosure.

Figure 20:
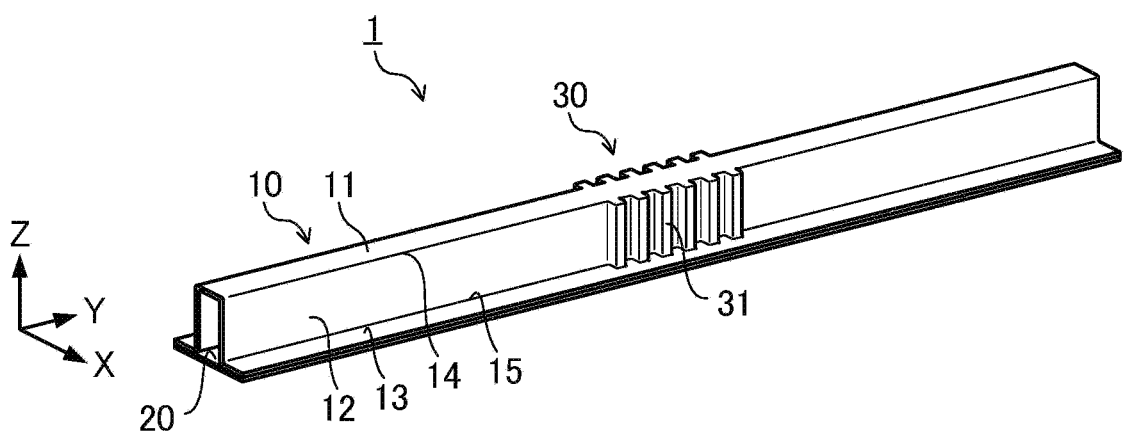
FIG. 20 is a view illustrating an example of shape of a groove part.
Figure 21:
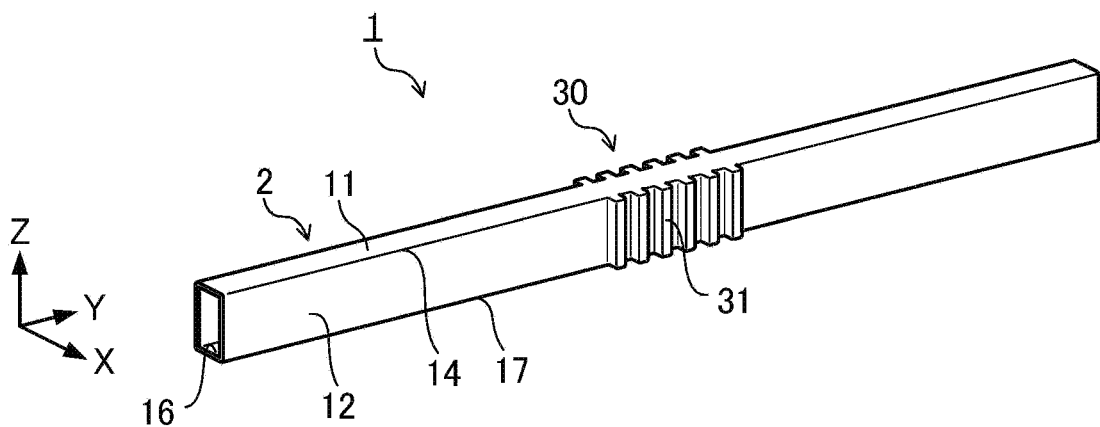
FIG. 21 is a view illustrating an example of shape of a groove part.

For example, although the shape of the groove part 31 with respect to the vertical wall 12 is a concave shape in the above-described embodiments, it may also be a convex shape as illustrated in FIG. 20 or FIG. 21. Also in this case, as long as the width a of the groove part 31, the depth b of the groove part 31, and the height c of the vertical wall 12 satisfy the relations of $0.2 \leq a/c \leq 0.3$ and $0.2 \leq b/c \leq 0.3$, the deformation in the axial crush mode is likely to occur, and it is possible to improve the energy absorption efficiency. Further, even if the groove part 31 having the convex shape is used, the length e of the groove part 31 is preferably 80% or more of the height c of the vertical wall 12, similarly to the above-described embodiments. Further, even if the groove part 31 having the convex shape is used, the interval d between the groove parts 31 is preferably 50 mm or less, similarly to the above-described embodiments.

EXAMPLES

<Simulation (1)>

Figure 22:
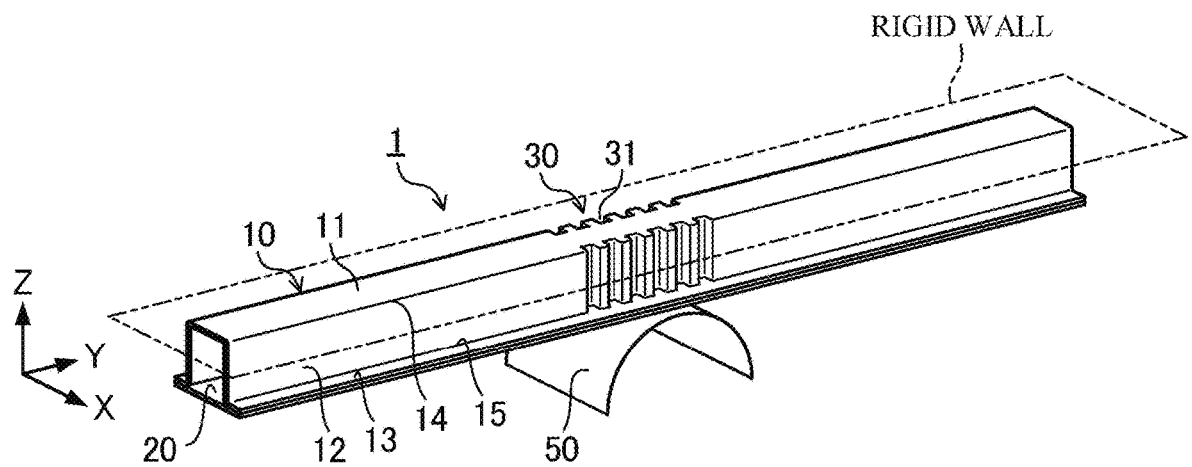
FIG. 22 is a view illustrating an analysis model in a collision simulation.

As one example of an automotive frame member according to the present disclosure, an analysis model (structure 1) as illustrated in FIG. 22 was created, and a simulation simulating pole side collision was carried out. The analysis model in FIG. 22 has a configuration similar to that of the automotive frame member illustrated in FIG. 1, and is configured by the hat member 10 and the closing plate 20. A material of each of the hat member 10 and the closing plate 20 is a steel product having tensile strength of 1180 MPa and a plate thickness of 1.6 mm. At a middle part of the hat member 10 in the member longitudinal direction, plural groove formation places 30 are provided. The entire length of the hat member 10 is 1500 mm, and the height c (the length in the Z direction) of the vertical wall 12 and the width (the length in the X direction) of the top plate 11 are respectively 100 mm. The width a and the depth b of the groove part 31 are respectively 20 mm. Specifically, the value of a/c and the value of b/c described above are respectively 0.2. The interval between the groove parts is 20 mm.

The simulation is carried out in a manner that a column-shaped impactor 50 with a radius of 127 mm is pressed against the closing plate 20, and the impactor 50 is displaced at a speed of 1.8 km/h. In the present simulation, a rigid wall is disposed on the top plate 11. Further, as a comparative example, an analysis model with a hat member provided with no groove part (structure 2) was created, and a simulation under conditions similar to the above-described conditions was carried out.

Figure 23:
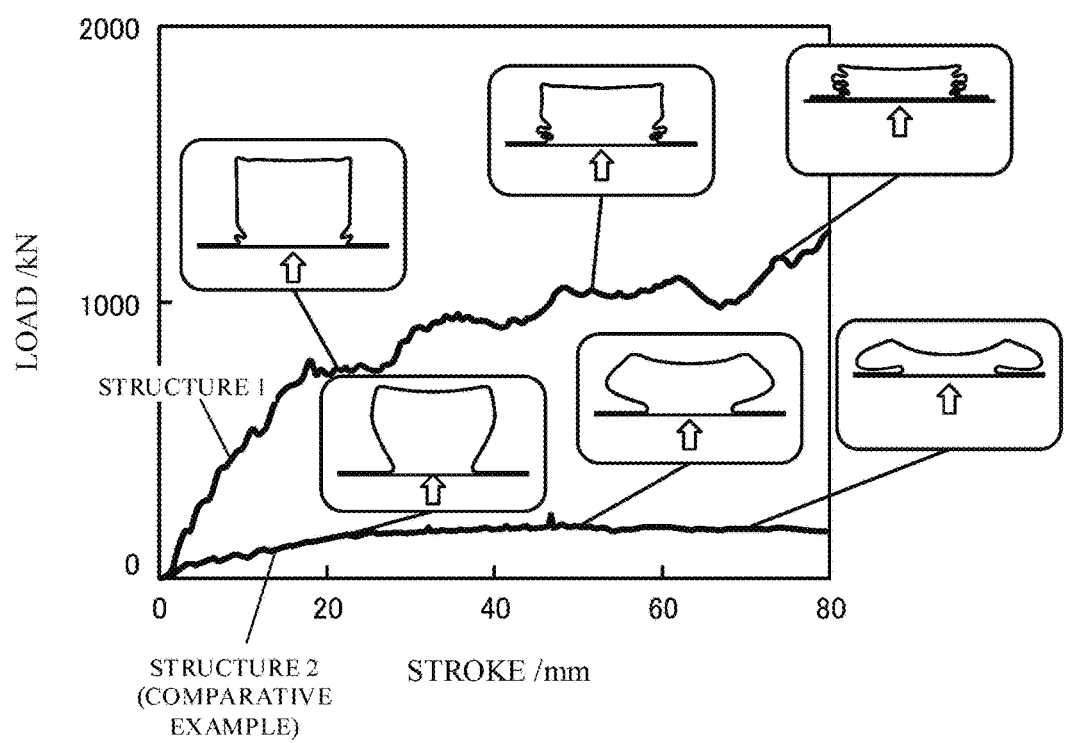
FIG. 23 is a load-stroke diagram in a simulation (1).

FIG. 23 is a load-stroke diagram in the simulation (1). A direction of arrow mark in FIG. 23 is an input direction. As illustrated in FIG. 23, the load in the structure 1 is larger than that in the structure 2 having no groove part, and thus the energy absorption performance in the structure 1 is improved.

<Simulation (2)>

Figure 24:
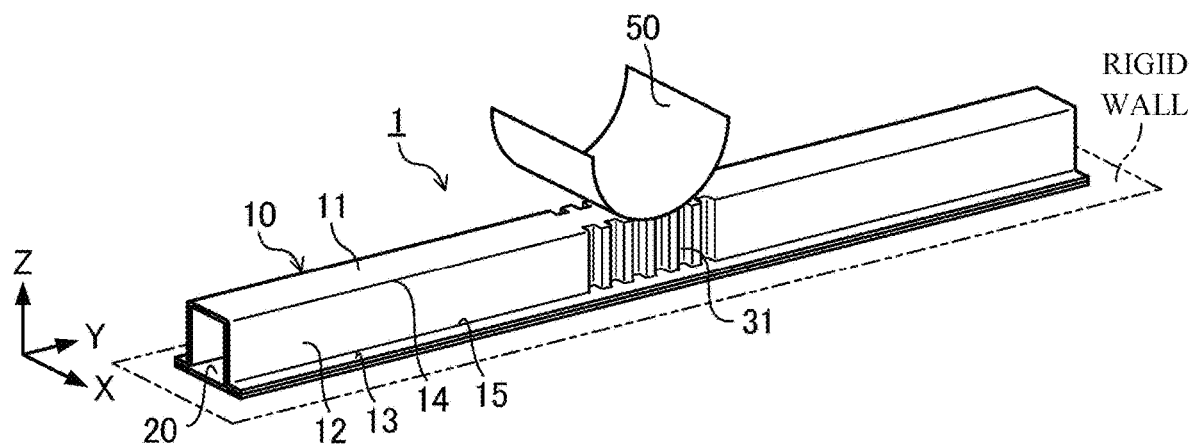
FIG. 24 is a view illustrating an analysis model in a collision simulation.

A simulation was carried out with an analysis model in which a rigid wall was disposed under the closing plate 20, and the impactor 50 was pressed against the top plate 11 of the hat member 10, as illustrated in FIG. 24. Note that the other simulation conditions are similar to those of the simulation (1).

Figure 25:
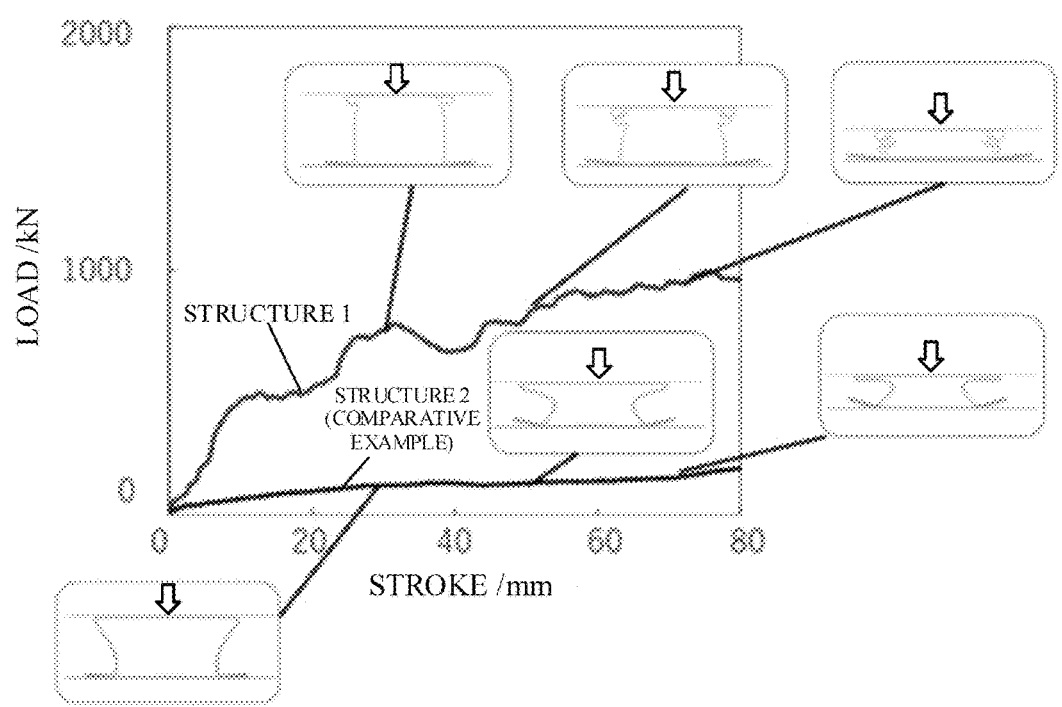
FIG. 25 is a load-stroke diagram in a simulation (2).

FIG. 25 is a load-stroke diagram in the simulation (2). A direction of arrow mark in FIG. 25 is an input direction. As illustrated in FIG. 25, the load in the structure 1 is larger than that in the structure 2 having no groove part, and thus the energy absorption performance in the structure 1 is improved. Based on the results of the simulations (1) and (2), it can be understood that the effect of improving the energy absorption performance can be achieved even if the top plate 11 is disposed on the vehicle-exterior side or on the vehicle-interior side.

<Simulation (3)>
Next, plural analysis models with different ratios between the width a of the groove part (FIG. 4) and the height c of the vertical wall (FIG. 6), and ratios between the depth b of the groove part (FIG. 4) and the height c of the vertical wall (FIG. 6) were created, and a simulation was carried out by using each of the analysis models. Note that the other simulation conditions are similar to those of the simulation (1).

Figures 26, 27:
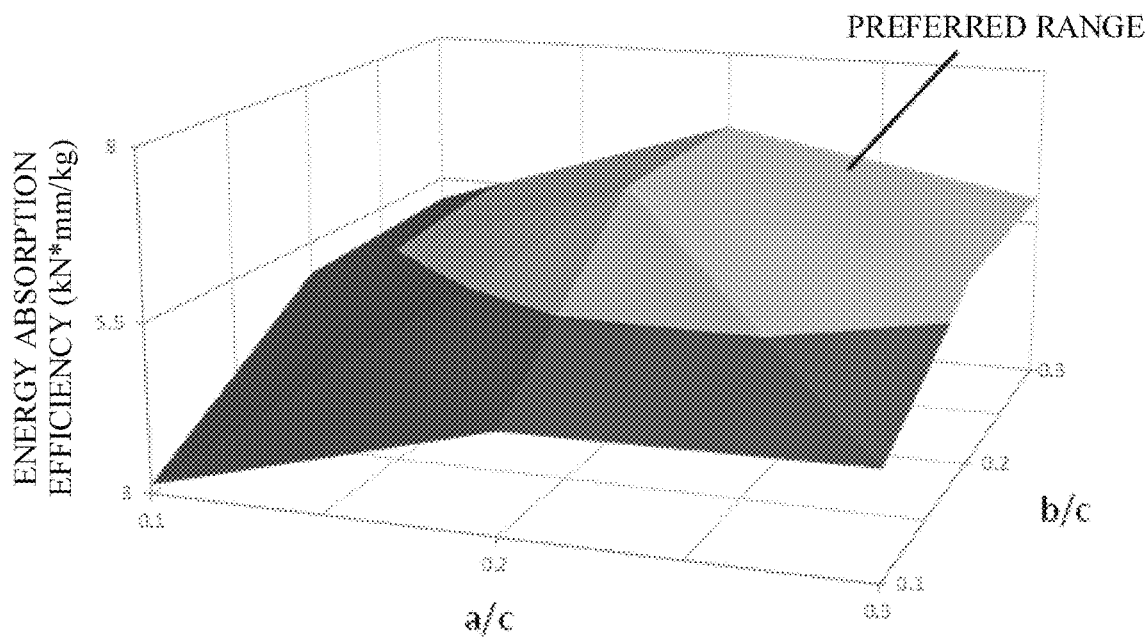
FIG. 26 is a view illustrating a relation among a/c, b/c, and an energy absorption efficiency in a simulation (3).
FIG. 27 is a view illustrating a relation among a/c, b/c, and a deformation mode in the simulation (3).

A relation among a/c, b/c, and the energy absorption efficiency in the simulation (3) is summarized as in FIG. 26. A "preferred range" illustrated in FIG. 26 is a range in which the energy absorption efficiency (absorbed energy/mass) becomes 5.0 [KN*mm/kg] or more. As illustrated in FIG. 26, when the a/c was 0.2 to 0.3 and the b/c was 0.2 to 0.3, the energy absorption efficiency became high in particular. As illustrated in FIG. 27, in the present simulation, when the a/c was 0.2 to 0.3, and b/c was 0.2 to 0.3, the deformation in the axial crush mode occurred in the automotive frame member.

<Simulation (4)>
Next, plural analysis models each having a different ratio between the length e of the groove part and the height c of the vertical wall in a structure as illustrated in FIG. 13 in which the groove part 31 does not extend to the ridge line portion 14 of the vertical wall 12 on the top plate 11 side, were created, and a simulation was carried out by using each of the analysis models. Note that the other simulation conditions are similar to those of the simulation (2).

Figure 28:
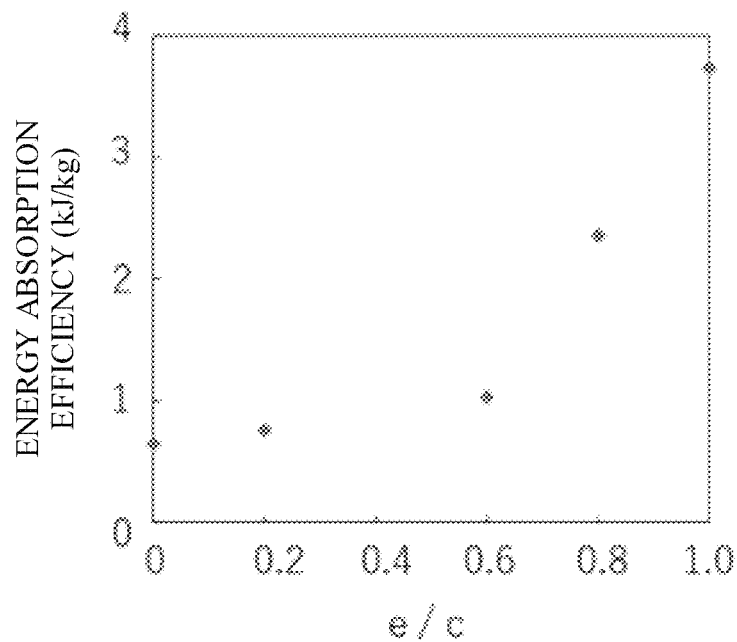
FIG. 28 is a view illustrating a relation between e/c and an energy absorption efficiency in a simulation (4).

FIG. 28 is a view illustrating a relation between e/c and the energy absorption efficiency in the simulation (4). As illustrated in FIG. 28, when the e/c was 0.8 or more, the energy absorption efficiency was dramatically improved when compared to a case where the e/c was less than 0.8. Note that under the condition of the present simulation, the deformation in the axial crush mode occurred in the automotive frame member when the e/c was 0.8 and when the e/c was 1.0. Specifically, when the length e of the groove part is the length of 80% or more of the height c of the vertical wall, the deformation in the axial crush mode is likely to occur, which enables to effectively improve the energy absorption efficiency.

<Simulation (5)>
Next, plural analysis models each having a different interval d between the groove parts (FIG. 4) were created, and a simulation was carried out by using each of the analysis models. Note that the other simulation conditions are similar to those of the simulation (2).

Figure 29:
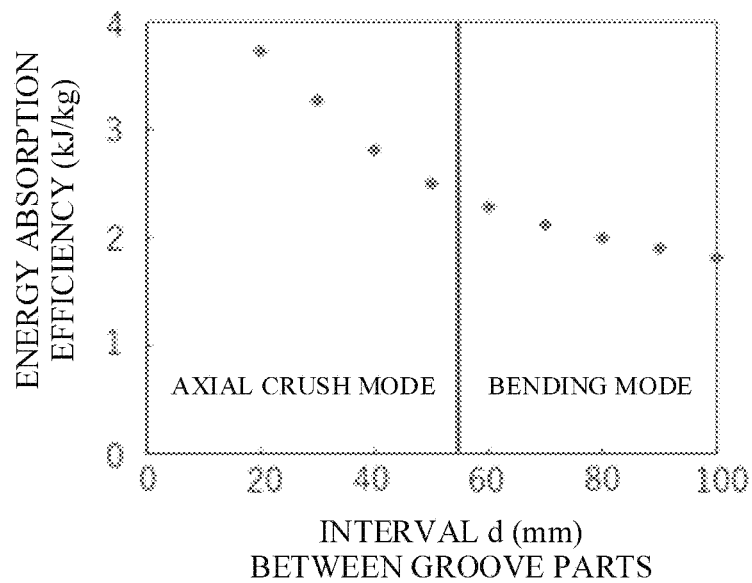
FIG. 29 is a view illustrating a relation between an interval d between groove parts and an energy absorption efficiency in a simulation (5).

FIG. 29 is a view illustrating a relation between the interval d between the groove parts and the energy absorption efficiency in the simulation (5). As illustrated in FIG. 29, under the condition of the present simulation, when the interval d between the groove parts was 50 mm or less, the deformation in the axial crush mode occurred, resulting in that the energy absorption efficiency was improved.

<Simulation (6)>
Next, an analysis model with an automotive frame member configured by a first hat member and a second hat member was created, and a simulation was carried out. A material of each of the first hat member and the second hat member is a steel product having tensile strength of 1180 MPa. Each of the first hat member and the second hat member is provided with the groove part, as illustrated in FIG. 16. In the present simulation, a ratio between a height $c_2$ of the second hat member and a height $c_1$ of the first hat member ($c_2/c_1$) is 0.25. A shape of the groove part is similar between the first hat member and the second hat member, except for the difference in heights of the hat members. The other simulation conditions are similar to those of the simulation (1). The simulation is carried out in plural analysis models with different width a of the groove part and depth b of the groove part.

Figure 30:
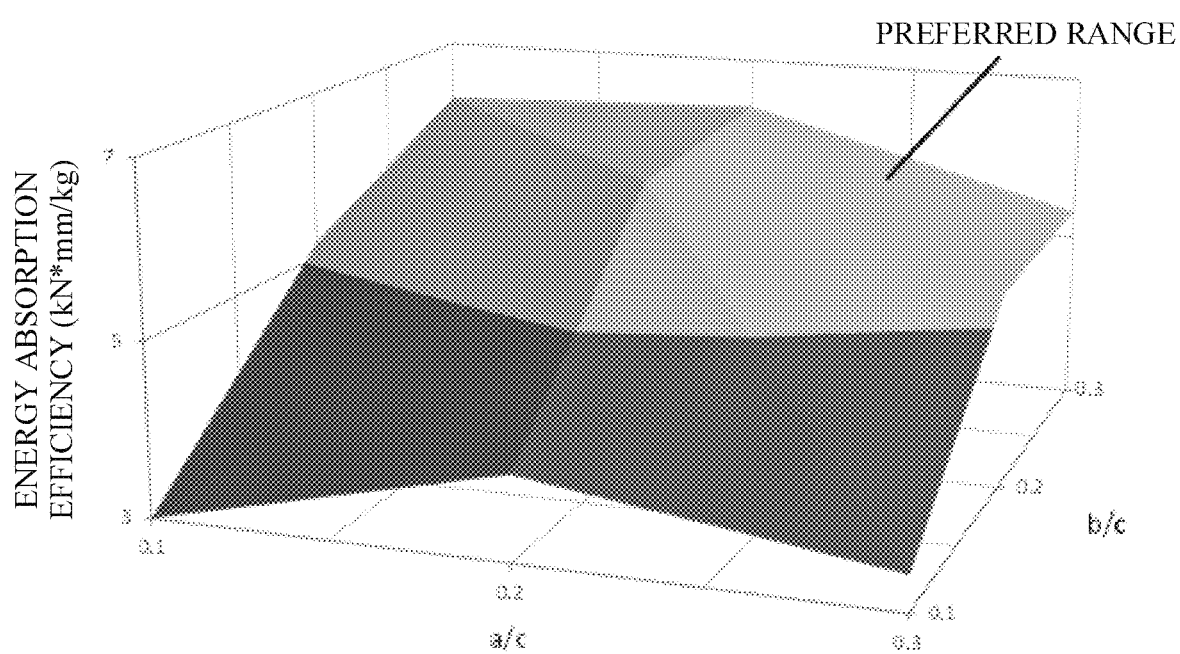
FIG. 30 is a view illustrating a relation among a/c, b/c, and an energy absorption efficiency in a simulation (6).

A relation among a/c, b/c, and the energy absorption efficiency in the simulation (6) is summarized as in FIG. 30. "c" is the sum of the height $c_1$ of the first hat member and the height $c_2$ of the second hat member. A "preferred range" illustrated in FIG. 30 is a range in which the energy absorption efficiency becomes 5.0 [kN*mm/kg] or more. Similarly to the simulation (3), when the a/c was 0.2 to 0.3 and the b/c was 0.2 to 0.3, the deformation in the axial crush mode occurred in the automotive frame member, and the mass efficiency of the energy absorption performance was improved. Note that in the present simulation, when the a/c was less than 0.2 and the b/c was 0.2 to 0.3, the deformation mode of the automotive frame member was an in-plane deformation mode, but the energy absorption efficiency was 5.0 [kN*mm/kg] or more. The reason why such a result was obtained is because, when the automotive frame member was deformed, the vertical wall positioned between the groove parts was brought into contact with the adjacent vertical wall, resulting in that the load was increased.

INDUSTRIAL APPLICABILITY

The technique according to the present disclosure can be used for a side sill, a bumper beam, and so on of an automotive.

EXPLANATION OF CODES 1 automotive frame member
2 hollow member
10 hat member
10a first hat member
10b second hat member
11 top plate
12 vertical wall
13 flange
14 ridge line portion
15 ridge line portion
16 bottom plate
17 ridge line portion
20 closing plate
30 groove formation place
31 groove part
31a bottom surface of groove part
31b side surface of groove part
32 groove part top plate
33 groove part vertical wall
34 groove part flange
35 groove part bottom plate
40 electric vehicle
41 side sill
42 battery
50 impactor
a width of groove part
b depth of groove part
c height of vertical wall
d interval between groove parts
e length of groove part
$\theta_1$ angle made by bottom surface of groove part and side surface of groove part
$\theta_2$ angle made by groove part vertical wall and groove part flange $\theta_3$ angle made by groove part vertical wall and groove part bottom plate

The invention claimed is:

1. An automotive frame member, comprising a hat member and a closing plate, wherein:
   the hat member includes a top plate, two vertical walls, and two flanges;
   the two vertical walls are positioned between the top plate and the flanges, respectively;
   the two vertical walls face each other;
   the two flanges are respectively joined to the closing plate;
   each of the two vertical walls includes plural groove parts extending in a direction perpendicular to a longitudinal direction of the hat member;
   the groove part includes a bottom surface and two side surfaces;
   the two side surfaces face each other;
   the two side surfaces are positioned on both sides of the bottom surface; and
   a width a of the groove part and a depth b of the groove part in a cross section parallel to the top plate, and a height c of the vertical wall in a direction perpendicular to the top plate satisfy relations of $0.2 \leq a/c \leq 0.3$ and $0.2 \leq b/c \leq 0.3$.

2. The automotive frame member according to claim 1, wherein:
   the groove part extends to a vehicle-interior-side end portion of the vertical wall; and
   a length e of the groove part in the direction perpendicular to the top plate is a length of 80% or more of the height c of the vertical wall.

3. The automotive frame member according to claim 1, wherein
   an interval d between the groove parts is 50 mm or less.

4. An automotive frame member, comprising a hollow member, wherein:
   the hollow member includes a top plate, a bottom plate, and two vertical walls;
   the top plate and the bottom plate face each other;
   the two vertical walls are respectively positioned between the top plate and the bottom plate;
   the two vertical walls face each other;
   each of the two vertical walls includes plural groove parts extending in a direction perpendicular to a longitudinal direction of the hollow member;
   the groove part includes a bottom surface and two side surfaces;
   the two side surfaces face each other;
   the two side surfaces are positioned on both sides of the bottom surface; and
   a width a of the groove part and a depth b of the groove part in a cross section parallel to the top plate, and a height c of the vertical wall in a direction perpendicular to the top plate satisfy relations of $0.2 \leq a/c \leq 0.3$ and $0.2 \leq b/c \leq 0.3$.

5. The automotive frame member according to claim 4, wherein:
   the groove part extends to a vehicle-interior-side end portion of the vertical wall; and
   a length e of the groove part in the direction perpendicular to the top plate is a length of 80% or more of the height c of the vertical wall.

6. The automotive frame member according to claim 4, wherein
   an interval d between the groove parts is 50 mm or less.

7. An electric vehicle, comprising
   a side sill including the automotive frame member according to claim 1, and a battery, wherein
   in a cross section vertical to a vehicle height direction, the closing plate is adjacent to the battery, and the top plate is disposed on a vehicle-exterior side.

8. An electric vehicle, comprising
   a side sill including the automotive frame member according to claim 4, and a battery, wherein:
   in a cross section vertical to a vehicle height direction, the bottom plate is adjacent to the battery; and
   the top plate is disposed on a vehicle-exterior side.

* * * * *